Patented May 22, 1951

2,553,618

UNITED STATES PATENT OFFICE 2,553,618

CEMENT BOUND AGGREGATE MASSES

Corwin D. Willson, Flint, Mich.

No Drawing. Substituted for application Serial No. 568,385, December 15, 1944. This application December 22, 1947, Serial No. 793,336

2 Claims. (Cl. 106—93)

This invention relates to cement-bound fibrous-aggregate materials, and this application is a substitution for my application Serial No. 568,385, filed December 15, 1944, now abandoned, the latter application being a continuation in part of my copending applications, Serial No. 485,642, filed May 4, 1943, now abandoned, and Serial No. 506,772, filed October 18, 1943. It is an object of this invention to provide a composition which is formed of aggregate materials and which has characteristics which render it highly resistant to damage from fire, water, rot, and insect attack and which is also highly weather resistant. The material under consideration is the type which may be mixed much as present day concrete is mixed and which may be formed into various building units and other articles by proper molding methods.

It is a further object of the present invention to provide an aggregate mix, using standard or high early strength Portland cements as the binding material together with an admix consisting of high alumina cement, calcium sulphate and calcium chloride. On the other hand, the aggregates used are not those used in ordinary concrete but are preferably inert organic materials such as saw dust, shavings, straw, and so forth.

Another object of the invention is a Portland cement bound mass of aggregate material, some organic; the mass containing, in addition to the calcium sulphoaluminate constituents of the Portland cement, other constituents of calcium sulphoaluminate and of different type and in the form of an admixture; and the mass comprising other compatible ingredients added to effect such physical characteristics of the mass as the density, elasticity thereof, and the thermal insulation efficiency, and the resistance to fire and water, and tensile and compressive strengths relative to the porosity and the like.

These and other novel features and objects of the invention, hereinafter to be more fully described and claimed, are intended to supply the present lack of a suitable low-cost, light-weight, and load-bearing composition for thermally insulative fire-safe and weather-resistant building construction: a composition that may be formed by hand or machine processes into boards or panels or blocks, or that may be poured or sprayed or applied with a trowel, and that may comprise largely such farm, forest and industrial wastes as are available in wide variety throughout the world.

The various features of the invention are best understood by citing a number of examples of compositions made according to the invention:

Example 1

For comparison, two batches were mixed: the first having an admix according to the invention and the second without admix. The first batch contained 825 g. sand, 275 g. high early strength Portland cement, 120 ml. water and 13 g. admix A. The second batch contained 825 g. sand, 288 g. high early strength Portland cement and 120 ml. water. Weight of the cement in the second batch thus equalled the combined weight of the cement and admix of the first batch. Each batch was molded into test specimens having the form of standard briquettes and 2" cubes. After final set, these were cured for seven days in very moist air and dried for 20 hours in an oven at 230 degrees F. Average dry weight of specimens of the first batch containing the admix was: briquettes, 134 g. each; cubes, 275 g.; and of the second batch without admix: briquettes, 135 g. each; cubes, 276 g. The specimens were then tested on standard apparatus for tensile and compressive strengths. These were, for the first batch, tensile stress p. s. i., 472; comp. stress p. s. i., 7037; and for the second batch without admix, ten. stress p. s. i., 455; comp. stress p. s. i., 6855. Admix A comprised 10 parts high alumina cement containing 5-3 and 3-5 calcium aluminates, 3 parts natural cement, 10 parts activated bauxite fines containing over 70 per cent alumina heat-treated to remove some of the hydration, 3 parts bentonite, a colloidal clay, 1 part aluminum sulphate, 6 parts calcium chloride, 1 part lime and $\frac{1}{10}$ part salicyclic acid.

Example 2

For comparison, two batches were mixed: the first containing 107 g. pine wood wool, 60 g. short-fibered asbestos, 260 g. high early strength Portland cement, 400 ml. water, and 33$\frac{1}{10}$ g. admix B; the second batch without admix containing 107 g. pine wood wool, 60 g. asbestos, 293$\frac{1}{10}$ g. high early strength Portland cement and 400 ml. water. The results of tests made on batch specimens molded and cured and dried in the manner described for the previous example were: for specimens containing admix, ten. stress p. s. i., 382; comp. stress p. s. i., 1833; for specimens without admix but with added cement, ten. stress p. s. i., 322; comp. stress p. s. i., 1445. Average dry weight first batch specimens was: briquettes, 51.3 g., cubes, 107.2 g.; and of specimens without admix but with added cement: briquettes, 52.3 g., cubes, 108.8 g. Strengths of specimens containing the admix, as in Example 1, were the greater even though weights were less. Admix B contained 15 parts high alumina cement containing 5-3 and 3-5 calcium aluminate, 5 parts calcined clay, 5 parts uncalcined clay, 1 part activated alum, a cheap form of aluminum sulfate used in treatment of sewage, 6 parts calcium chloride.

*Example 3*

55 g. cottonwood wool, 25 g. stoneground yellow pine fiber, 30 g. short fibered asbestos, 260 g. high early strength Portland cement, 400 ml. water and 32 1/16 g. admix C were mixed, molded, cured, dried and tested as previously described and results of the tests were: ten. stress p. s. i., 433; comp. stress p. s. i., 1933. Weight of the cubes from this batch averaged 111 g. and of the briquettes, 51.5 g. Admix C comprised 15 g. "Lumnite," high alumina cement containing 5-3 and 3-5 calcium aluminates, 5 g. heat-treated bauxite, 5 g. bentonite, 1 g. calcium sulfate in the form of plaster of Paris, 6 g. calcium oxychloride, 1/16 g. phosphoric acid.

In more than a thousand different batches comprising the stable calcium sulphoaluminate constituents admixture here being described, it was found that by varying the amounts and kinds of aggregate materials and the addition of compatible leavening and hardening agents, the water-cement ratio and the like that a family of compositions resulted which differed in strength-weight ratio according to the following table:

| Weight Group | Comp. Strength | Ten. Strength |
| --- | --- | --- |
| lb./cu. ft. | p. s. i. | p. s. i. |
| 22–27 | 150 | 60 |
| 27–32 | 375 | 185 |
| 32–35 | 700 | 220 |
| 35–38 | 895 | 233 |
| 38–42 | 985 | 350 |
| 42–44 | 1,204 | 385 |
| 44–46 | 1,431 | 405 |
| 46–48 | 1,054 | 415 |
| 48–50 | 1,958 | 426 |
| 50–52 | 2,104 | 447 |
| 52–54 | 2,408 | 470 |
| 54–56 | 2,543 | 498 |
| 56–58 | 2,687 | 501 |
| 58–60 | 2,870 | 527 |
| 60–62 | 3,179 | 540 |
| 62–66 | 3,325 | 555 |
| 66–68 | 3,500 | 615 |
| 68–70 | 3,658 | 635 |
| 70–75 | 3,800 | 661 |
| 75–82 | 3,925 plus | 740 |

From this table, it is apparent that the ratios of weight to compressive strength of these compositions is 1 to 40 compared with a ratio of 1 to 20 for standard concrete; and the ratio of weight to tensile strength of these compositions is 1 to 8 compared with a ratio of 1 to 2 for standard concrete. In other words, these compositions, relative to weight, are twice as strong in compression and four times as strong in tensile stress as standard concrete. The comparison becomes even more striking if made between these compositions and concrete of the standard type made from light weight aggregates such as popped slag and vermiculite. In fact, no other light-weight, weather-proof Portland cement bound compositions made without pressure and having these low densities, have ever demonstrated anywhere near these strengths.

The following organic materials can be used in the mixes above described: saw dust, hammer-milled planer shavings, scrap excelsior, wood pulp, and shredded wood from flax shives, cotton linters and stalks, grain hulls, nut husks and shells, grain straws, palmetto fiber, bagasse and corn stalks, grasses, reeds, leaves, and bamboo culm. It is best to treat these organic aggregates with mild alkali or a weak solution of barium hydroxide and a solution of alum to remove harmful solubles. Likewise, inorganic fillers such as stone dust, grog, clay, diatomaceous earth, fly-ash, and freshly burned coal ash fines may be added to vary the character of the compositions. I have also found it preferable in most cases to include a wetting agent such as the sodium salt of an alkyl naphthalene sulfonic acid.

The important contribution that I feel I have made to the art of weather-proof compositions formed of Portland cement and fibrous organic aggregates is the addition to the Portland cement binder of an admix consisting basically of:

A high alumina cement (Lumnite)
A sulphate of aluminum or calcium
A chloride or oxychloride of calcium Study of the batches tested indicated that where these comprised a preponderant bulk of organic ingredients, the Portland cement binder varied from 2¼ to 5 times the weight of the organic aggregates while being but a fraction of their bulk. Effective blending of the organic fibers with ⅛ to ¼ by weight of inorganic fibers permitted less cement to be used to attain a desired strength with a corresponding decrease in weight. The admixture constituents varied relative to their strength and proportions in the admixture and relative to the kinds of aggregates and brands of cement used. A fibrous bound mass of low density obviously had larger voids and could withstand a greater internal growth of calcium sulphoaluminate crystals than could a very high-density mass of rigid aggregate ingredients that lacked such voids. (Contrast Example 1 above with Examples 2 and 3.) Experiment proved that my admixture, in its simplest form, might comprise only high alumina cement, containing 5-3 and 3-5 calcium aluminates, and a sulphate, such as aluminum or calcium sulphates since in aqueous solution these constituents would react one with the other to form the stable type of calcium sulphoaluminate above described. However, quicker results were secured by the addition of a chloride, such as aluminum or calcium chloride or calcium oxychloride. Still better results were secured where the admixture also included a heat-treated high alumina clay, such as activated bauxite, and raw or colloidal clay, such as bentonite or aluminum hydrate. Where the fibers used leaned toward the acid side or where the Portland cement used lacked free lime, the admixture constituents included a very small amount of lime. In other words, the proportions of admixture constituents were varied in adaptation to variables in the other ingredients of the bound mass, in some instances the high alumina cement exceeding the amount of heat-treated high alumina clay and in other instance vice versa within the limits of the following formula:

```
                                     Parts by weight
High alumina cement _____ 5 to 15
Heat-treated clay _____ 15 to 5
Raw clay _____ 1 to 5
Sulphate _____ ½ to 3
Chloride _____ 2 to 8
```

The exact effect of the heat-treated clay, such as activated bauxite, and the raw or colloidal clay, such as bentonite or aluminum hydrate, is not known. Of course, the alumina in these clays will react in time with any free lime in the mixture and with the sulphate to form calcium sulphoaluminate. But experiment shows that even where there has not been sufficient time for appreciable amounts of calcium sulphonaluminate to have been formed in this manner, the clays noticeably increase the strength of the molded specimens. The raw clay appears to assist in the colloidal dispersion and gel-forming quality of the admix. This may be an important factor where a quantity of admix, which should be from 5 to 15 per cent by weight of admix relative to the Portland cement used in a specific batch, is to be dispersed intimately throughout the mass in a few minutes of mixing. And it may be that the clay, in batches containing organic fiber aggregates, helps to coat the fiber in a manner increasing the adhesion of the matrix as it dries.

What I claim is:

1. A strong lightweight weather-resistant bound mass of aggregate material including vegetable fiber dispersed in a hard-set binder above 80 per cent thereof comprising Portland cement and from 5–15 per cent comprising an admixture having the approximate formula: high alumina cement by weight, 5–15 parts of the admixture; high alumina clay, 15–5 parts; raw clay, 1–5 parts; calcium sulphate, ½–3 parts; and a chloride of calcium, 2–8 parts.

2. A strong lightweight weather-resistant bound mass of aggregate material including vegetable fiber and mineral fiber dispersed in a hard-set binder above 80 per cent thereof comprising Portland cement and from 5–15 per cent comprising an admixture having the approximate formula: high alumina cement by weight, 5–15 parts of the admixture; high alumina clap, 15–5 parts; raw clay, 1–5 parts; calcium sulphate, ½–3 parts; and a chloride of calcium, 2–8 parts.

CORWIN D. WILLSON.

REFERENCES CITED

The following references are of record in the file of this patent:

UNITED STATES PATENTS

| Number | Name | Date |
| --- | --- | --- |
| 1,157,234 | Lester | Oct. 19, 1915 |
| 1,194,926 | Anderson | Aug. 15, 1916 |
| 1,422,337 | Catlett | June 11, 1922 |
| 1,460,643 | Curtis | July 3, 1923 |
| 1,521,813 | Hornstein | Jan. 6, 1925 |
| 2,043,249 | Jones | June 9, 1936 |
| 2,057,330 | Eichert | Oct. 13, 1936 |
| 2,121,087 | Labra | June 21, 1938 |
| 2,264,336 | Scripture | Dec. 2, 1941 |
| 2,271,443 | Schuh | Jan. 27, 1942 |
| 2,432,971 | Ruthman | Dec. 16, 1947 |

FOREIGN PATENTS

| Number | Country | Date |
| --- | --- | --- |
| 244,178 | Great Britain | 1925 |
| 780,747 | France | 1935 |
| 202,785 | Switzerland | 1939 |
| 843,851 | France | 1939 |

OTHER REFERENCES

Lea and Desch: The Chemistry of Cement and Concrete, E. Arnold, London, 1935, p. 187.